United States Patent
Utas

(10) Patent No.: US 6,515,983 B1
(45) Date of Patent: Feb. 4, 2003

(54) CONNECTION PROTOCOL FOR MOBILE TERMINALS

(75) Inventor: Gregory R. Utas, Dallas County, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/210,427

(22) Filed: Dec. 11, 1998

(51) Int. Cl.[7] ................................................. H04J 3/16
(52) U.S. Cl. ........................................................ 370/352
(58) Field of Search ................................. 370/259, 260, 370/261, 278, 262, 296, 352, 353, 355, 356, 389, 395.52, 493, 282, 375, 220, 222; 379/93.34, 93.32, 93.31, 93.09

(56) References Cited

U.S. PATENT DOCUMENTS

| | | | |
|---|---|---|---|
| 4,852,151 A | * 7/1989 | Dittakavi et al. | 379/215.01 |
| 4,890,316 A | * 12/1989 | Walsh et al. | 370/282 |
| 4,893,307 A | * 1/1990 | McKay et al. | 370/389 |
| 5,355,365 A | * 10/1994 | Bhat et al. | 370/401 |
| 5,369,704 A | * 11/1994 | Bennett et al. | 348/14.08 |
| 5,475,421 A | * 12/1995 | Palmer et al. | 348/14.1 |
| 5,524,110 A | * 6/1996 | Danneels et al. | 370/260 |
| 5,528,595 A | * 6/1996 | Walsh et al. | 370/402 |
| 5,663,951 A | * 9/1997 | Danneels et al. | 370/230 |
| 5,768,350 A | * 6/1998 | Venkatakrishnan | 370/418 |
| 6,005,845 A | * 12/1999 | Svennesson et al. | 370/260 |
| 6,028,924 A | * 2/2000 | Ram et al. | 379/229 |
| 6,061,363 A | * 5/2000 | Evans et al. | 370/467 |

\* cited by examiner

Primary Examiner—Wellington Chin
Assistant Examiner—William Schultz
(74) Attorney, Agent, or Firm—Haynes and Boone, LLP

(57) ABSTRACT

A method for establishing a connection, either circuit-switched or packet-switched, between first and second mobile terminals of a telecommunications network and an associated switching node which includes a connection handler and a connection agent for each mobile terminal. To establish the connection, the connection handler determines if the connection agent for the first terminal is willing to transmit to the connection agent for the second terminal. If so, the first connection agent transmits a first endpoint address to the second connection agent. The connection handler determines if the second connection agent is willing to listen to the first connection agent and, if so, the first endpoint address is accepted by the second connection agent. A one-way connection between the first terminal and the second terminal in-which the first terminal can talk to the second terminal and the second terminal can listen to the first terminal is then established. The connection handler further determines if the second connection agent is willing to transmit to the first connection agent. If so, the second connection agent transmits a second endpoint address to the first connection agent. The connection handler determines if the first connection agent is willing to listen to the second connection agent and, if so, the first connection agent accepts the second endpoint address. A return connection between the first and second terminals in which the second terminal can talk to the first terminal and the first terminal can listen to the second terminal is then established.

6 Claims, 1 Drawing Sheet

CONNECTION PROTOCOL FOR MOBILE TERMINALS

TECHNICAL FIELD

The invention relates generally to call processing techniques for a telecommunications network and, more particularly, to a protocol for completing circuit or packet-switched connections between mobile and other terminals of the telecommunications network.

BACKGROUND OF THE INVENTION

Within a telecommunications network, a switching system or other type of switching node couples originating and terminating stations for a call. Residing within a typical switching node are first and second software modules, commonly referred to as an originating call handler and a terminating call handler, respectively. The originating call handler handles exchanges of messages with the originating stations while the terminating call handler handles exchanges of messages with the terminating stations. In one configuration thereof, one or both of the originating and terminating stations may be terminals where the call actually originates and/or terminates. In an alternate configuration thereof, one or both of the originating and terminating stations may be trunks which couple the switching node to a next switching node. In either configuration, however, to complete a call involves a series of exchanges—from the originating station to the originating call handler, from the originating call handler to the terminating call handler and from the terminating call handler to the terminating station. The net effect of the various exchanges that are required to complete a call is that the connection protocol for calls is both complex and consumes an excessive amount of resources.

There have been several attempts to simplify the connection protocol for a call. In one such attempt, the originating and terminating call handlers which reside at the switch and which control exchanges with the originating and terminating stations, respectively, were replaced with a single handler which conducted exchanges with both stations. To create such a handler, however, requires explicit knowledge of both the originating and terminating access links. While the resultant handler is able to rapidly conduct exchanges, continued maintenance of the handler is a difficult task. For example, since the various stations are coupled together by the single handler, a software update to one station may require updates to all of the stations which interact with the updated station by way of the single handler.

In any event, use of a central entity that brokers or otherwise oversees the connection between the originating and terminating stations remains a highly inefficient use of resources. It is, therefore, the object of this invention to provide a connection protocol for controlling circuit or packet-switched connections which equally distributes overseeing of the connection between agents of the originating and termination stations.

SUMMARY OF THE INVENTION

In one embodiment, the present invention is of a method for establishing a one-way switched connection between a first terminal and a second terminal in which the connection between the first and second terminals is established only when an agent of the first terminal is willing to transmit to an agent of the second terminal and the agent of the second terminal is willing to listen to the agent of first terminal. Preferably, the agent of the first terminal transmits an endpoint address needed to complete the connection between the terminals and, upon acceptance of the endpoint address by the second terminal, the one-way connection between the terminals is established. In alternate aspects thereof, the one-way connection may either be a circuit-switched connection or a packet-switched connection. In further aspects of the one-way circuit-switched connection aspect of the invention, the first terminal may transmit either a nil address or a conference port address to the second terminal. If the agent of the second terminal accepts the nil address, the second terminal will be placed on hold for the first terminal. If the agent of the second terminal accepts the conference port address, the second terminal will enter into a conference call which includes the first terminal.

In another embodiment, the present invention is of a method for establishing a bi-directional connection between a first terminal and a second terminal in which the bidirectional connection between the first terminal and the second terminal is only established when an agent of the first terminal is willing to transmit to an agent of the second terminal, the agent of the second terminal is willing to listen to the agent of the first terminal, the agent of the second terminal is willing to transmit to the agent of the first terminal and the agent of the first terminal is willing to listen to the agent of the second terminal. Preferably, when the agent of the first station is willing to transmit to the agent of the second station, the agent of the first station transmits a first endpoint address which identifies the location of the first station and, when the agent of the second station is willing to transmit to the agent of the first station, the agent of the second station transmits a second endpoint address which identifies the location of the second terminal. Upon the agent of the second terminal accepting the first endpoint address and the agent of the first terminal accepting the second endpoint address, the bidirectional connection between said first and second terminals is established. As before, in alternate aspects of this embodiment, the bi-directional connection may either be a circuit-switched connection or a packet-switched connection.

In still another embodiment, the present invention is of a method for establishing a circuit-switched connection between a first terminal of a telecommunications network and a second terminal of the telecommunications network. The method is commenced by determining if the first connection agent is willing to transmit to the second connection agent. If the first connection agent is willing to transmit to the second connection agent, the first connection agent transmits a first endpoint address for the first terminal to the second connection agent. It is then determined if the second connection agent is willing to listen to the first connection agent. If the second connection agent is willing to listen to the first connection agent, the first endpoint address is used to establish a one-way circuit-switched connection between the first terminal and the second terminal such that the first terminal can talk to the second terminal and the second terminal can listen to the first terminal. In one aspect thereof, it is further determined if the second connection agent is willing to transmit to the first connection agent. If the second connection agent is willing to transmit to the first connection agent, the second connection agent transmits a second endpoint address for the second terminal to the first connection agent. It is then determined if the first connection agent is willing to listen to the second connection agent. If the first connection agent is willing to listen to the second connection agent, the second endpoint address is then used to establish a return circuit-switched connection between the first and second terminals in which the second terminal can talk to the first terminal and the first terminal can listen to the second terminal.

In still yet another embodiment, the present invention is of a switching node for a telecommunications network which includes first and second terminals. The switching node includes a first connection agent for handling exchanges with the first terminal, a second connection agent for handling exchanges with the second terminal and a connection handler for handling exchanges between the first connection agent and the second connection agent. The connection handler transfers an endpoint address for the first terminal from the first connection agent to the second connection agent only if the first connection agent is willing to transmit to the second connection agent and the second connection agent is willing to listen to the first connection agent and transfers an endpoint address for the second terminal from the second connection agent to the first connection agent only if the second connection agent is willing to transmit to the first connection agent and the first connection agent is willing to listen to the second connection agent. In one aspect thereof, the first terminal is a first mobile terminal, the second terminal is a second mobile terminal, the switching node is a mobile switching center and the telecommunications network is a wireless network. In another, the connection handler module resides within a call processing application of the mobile switching center. In still another, a circuit/packet switching module coupled to the first connection agent, the second connection agent and the connection handler, transfers the endpoint address for the first terminal from the first connection agent to the second connection agent and transfers the endpoint address for the second terminal from the second connection agent to the first connection agent in response to instructions issued by the connection handler.

DESCRIPTION OF A PREFERRED EMBODIMENT

Figure 1:
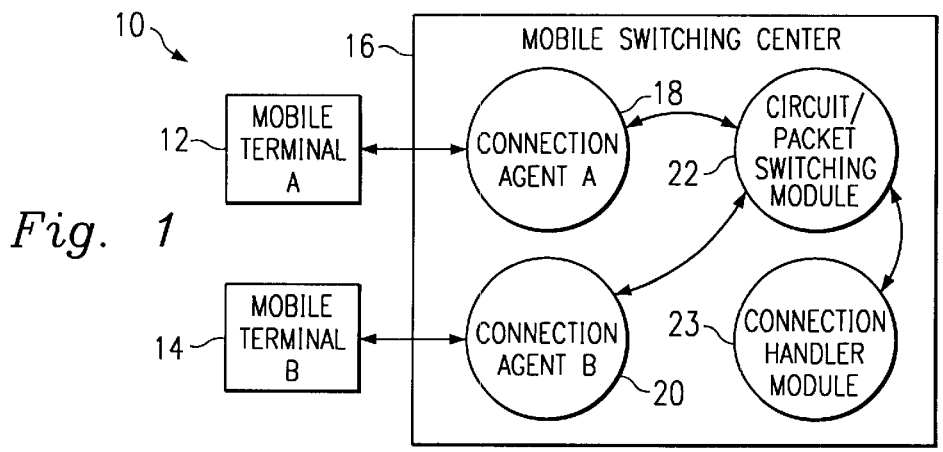
FIG. 1 is a block diagram of a wireless telecommunications network which includes first and second mobile terminals and a mobile switching center which embodies features of the present invention.

Turning now to the drawings, in FIG. 1, the reference numeral 10 designates a telecommunications network 10. While, in the example to follow, the telecommunications network 10 is disclosed to be a wireless communications system such as either a cellular network or a personal communication service (or "PCS") network, it should be clearly understood that the invention is equally suitable for use with other types of telecommunications networks, including wireline networks such the public switched telephone network (or "PSTN"). The wireless telecommunications network 10 includes first and second mobile terminals 12 and 14, each of which are configured to transmit messages to and receive messages from a mobile switching center (or "MSC") via respective base stations (not shown) within range of the mobile terminals 12 and 14 and coupled to the MSC 16. Of course, if the first and second mobile terminals 12 and 14 are sufficiently proximate to each other, both may be coupled to the MSC 16 by way of the same base station. Finally, the MSC 16 is coupled to a PSTN (not shown) or other wireline telecommunications network, for example, via a local exchange carrier (or "LEC") (also not shown).

The MSC 16 operates as a switching node which assists in completion of a call originating at a first mobile terminal 12 and having, as its destination, a second mobile terminal 14. A first connection agent 18 residing within the MSC 16 is established by the MSC 16 upon registration of the first mobile terminal 12 with the MSC 16. Similarly, a second connection agent 20 residing within the MSC 16 is established by the MSC 16 upon registration of the second mobile terminal 14 with the MSC 16. The first connection agent 18 handles exchanges between the mobile terminal 12 and the MSC 16. Similarly, the second connection agent 20 handles exchanges between the second mobile terminal 14 and the MSC 16.

While the disclosed embodiment of the invention discloses a wireless system as the telecommunications network, an MSC as the switching node and mobile terminals as the originating and terminating stations, it should be clearly understood that the disclosed embodiment is purely exemplary and that the invention is equally suitable for use in conjunction with other types of telecommunications networks, switching nodes and/or stations. It should be further understood that, for the disclosed embodiment of the invention, the MSC 16 has been greatly simplified and that various components thereof have been omitted for ease of illustration. As will be more fully described below, the MSC 16, which, for example, may be a DMS-GSM MSC manufactured by Northern Telecom Ltd. of Montreal, Canada, performs switching operations, as well as a variety of call processing (or "CP") operations such as call set-up, call forwarding and conference calling.

It is further contemplated that the MSC 16 to handle the exchange of messages in a variety of modes, including both circuit and packet-switching. In circuit-switching, the MSC 16 establishes a connection to be used exclusively by the mobile terminal 12 and the mobile terminal 14 until released. In packet switching, the MSC 16 periodically selects a route and forwards one or more packets of data received from one of the mobile terminals 12, 14 to the other of the mobile terminals 12, 14. To perform switching operations in multiple modes, the MSC 16 includes a circuit/packet-switching module 22 coupled to the first and second connection agents 18 and 20. The circuit/packet-switching module 22 identifies how messages to be received from the mobile terminals 12 and 14 are configured and, upon receipt, forwards the messages in the appropriate manner to their destination.

The description to follow sets forth the protocol by which the MSC 16 establishes either a one-way or two-way connection between the mobile terminals 12 and 14 using circuit-switching. For packet-switching, the protocol would vary little from that disclosed herein. It should be noted, however, that the description to follow includes a number of references to the receipt of an "endpoint address". In circuit-switching, the endpoint address of a mobile terminal would be a port address. In packet-switching, however, the endpoint address of a mobile terminal would be an internet protocol (or "IP") address.

To perform the aforementioned, as well as other, CP operations, it is further contemplated that the MSC 16 will also include a processor subsystem (not shown) on which plural CP applications reside as software modules. One such software module, hereafter referred to as connection handler module 23, is shown as residing on the MSC 16. The connection handler module 23 is a software module which handles transmissions from the first connection agent 18 (hereafter referred to as "connection agent A") to the second connection agent 20 (hereafter referred to as "connection agent B") and from the connection agent B to the connection agent A via the circuit/packet-switching module 22. The connection agent A, the connection handler module 23 and the connection agent B are configured to handle messages formatted in accordance with a call interworking (or "I/W") protocol that is based on industry standards and that is enhanced to support connection control between two ports that appear on the switch. It is fully contemplated, however, that one or more of the connection agent A, the connection handler module 23 and the connection agent B may be configured to also support one or more additional I/W protocols. In such alternate configurations, however, preferred protocol selection and/or inter-protocol translation applications techniques may reside within one or more of the connection agent A, the connection handler module 23 and/or the connection agent B.

The circuit/packet-switching module 22 is a hardware device, residing within the MSC 16, which handles exchanges between the connection agents A and B. While the circuit/packet-switching module 22 physically handles the exchanges, it operates under the control of the connection handler module 23. Accordingly, upon receipt of connection requests, replies or other messages from the connection agents A and B, the circuit/packet-switching module 22 advises the connection handler module 23 of the type of message which has been received. In turn, the connection handler module 23 determines an appropriate response to the received message and transmits an appropriate instruction to the circuit/packet-switching module 22. The circuit/packet-switching module 22 would then respond to the received message in accordance with the instructions received from the connection handler module 23.

Figure 2:
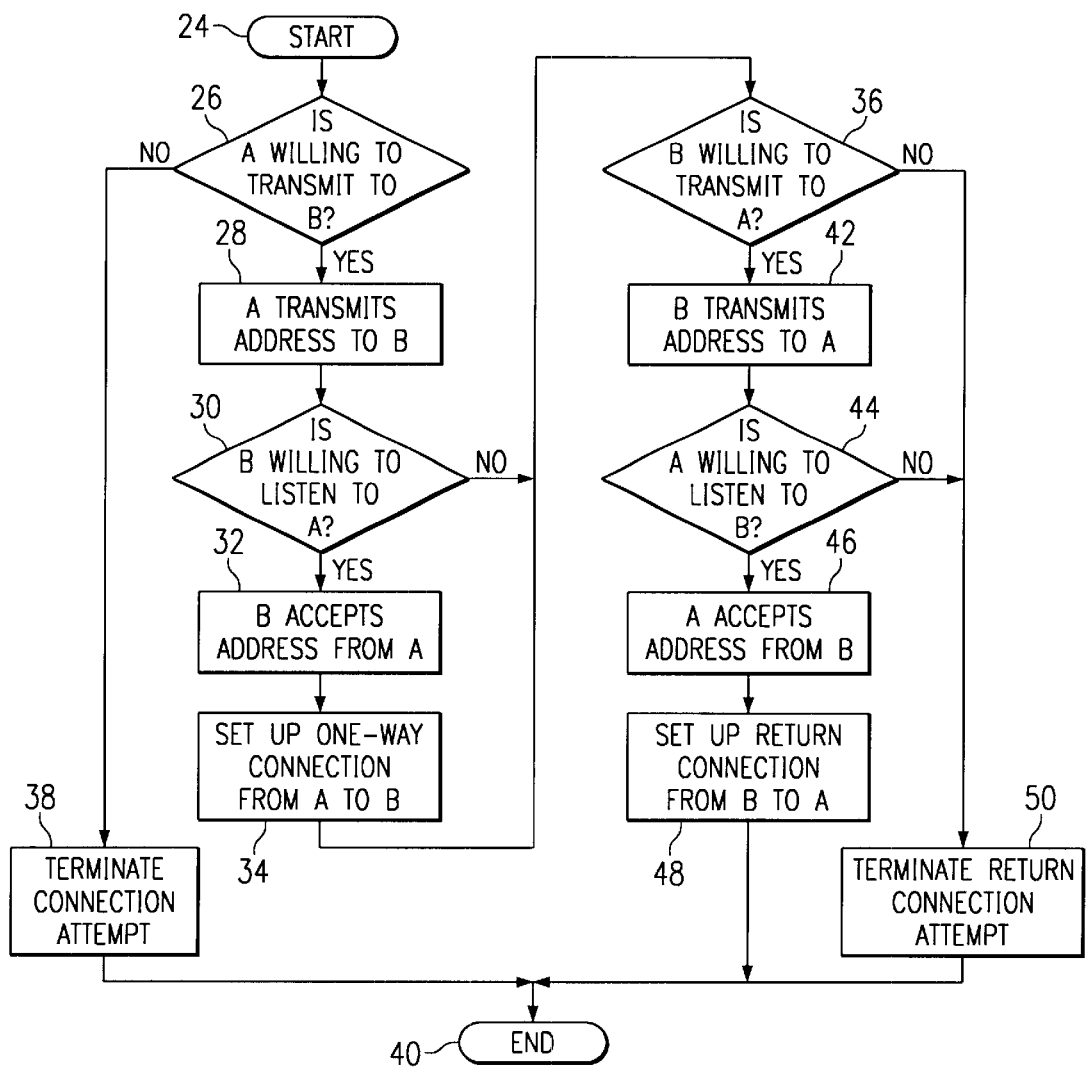
FIG. 2 is a flow chart of a protocol for establishing a bidirectional circuit-switched connection between the first and second mobile terminals of FIG. 1.

Referring next to FIG. 2, a protocol by which the connection agent A interworks with the connection agent B when an originating station, in the foregoing example, the mobile terminal 12, initiates a request for connection with a terminating station, here, the mobile terminal 14, will now be described in greater detail. Before describing the protocol subject of the present invention, it should be noted that, as disclosed herein, both the originating station and the terminating station are mobile terminals coupled to a wireless telecommunications network by an MSC. It is specifically contemplated, however, that one or both of the originating and terminating stations may be trunks which couple the MSC 16 (or other type of switching node) to other switching nodes. In still other alternate configurations thereof, one or both of the originating and termination stations 12 and 14 may be located within the wireless telecommunications network 10 as illustrated in FIG. 1, within the PSTN coupled to the wireless telecommunications network 10, or outside of both the wireless telecommunications network 10 and the PSTN. For example, the originating station may be within the wireless telecommunications network 10 while the terminating station may be a trunk located within the PSTN coupled to the wireless telecommunications network 10. Finally, it should be clearly understood that the telecommunications network 10 will typically include includes a wide array of other, conventional, devices which have been omitted from FIG. 1 for ease of illustration.

The method commences at step 24 when the mobile terminal 12 issues, to the MSC 16, a request for connection to the mobile terminal 14. The request for connection issued by the mobile terminal 12 is received, at the MSC 16, by the connection agent A and, at step 26, the connection protocol commences by the connection agent A first determining if it is willing to transmit to the connection agent B. If the connection agent A is willing to make such a transmission, the method proceeds to step 28 where the connection agent A transmits its endpoint address to the connection agent B. If, however, the connection agent A is not willing to transmit to the mobile terminal 14, the method proceeds to step 38 where the attempt to establish a connection between the mobile terminal 12 and the mobile terminal 14 is terminated. The method then ends at step 40.

The endpoint address transmitted by the connection agent A is transmitted to the connection agent B via the circuit/packet-switching module 22 of the MSC 16. Upon receiving the endpoint address from the connection agent A, the circuit/packet-switching module 22 advises the connection handler module 23 of receipt of the endpoint address for the connection agent A. The connection handler module 23 would then instruct the circuit/packet-switching module 22 to forward the received endpoint address to the connection agent B. Having received the address for the connection agent A, at step 30, the connection agent B determines if it is willing to listen to the connection agent 18. If the connection agent B determines that it is unwilling to listen to the connection agent A, the method proceeds to step 36 where an attempt to establish a one-way connection between the mobile terminal 14 and the mobile terminal 12 is initiated. For example, if, rather than the mobile terminal 14, the request for connection initiated by the mobile terminal 12 was directed to an announcement trunk, the announcement trunk may not be willing to listen to the mobile terminal 12. The announcement trunk would, however, want to establish a one-way connection to the mobile terminal 12 so that the mobile terminal 12 would be able to listen to the announcement trunk.

Returning now to step 30, if the connection agent B determines that it is willing to listen to the connection agent A, the method proceeds to step 32 where the connection agent B accepts the endpoint address transmitted by the connection agent A. Upon accepting the endpoint address, the method proceeds on to step 34 where the circuit/packet-switching module 23, together with the connection agents A and B, attend to the set-up of a one-way connection from the mobile terminal 12 to the mobile terminal 14.

Once set-up of the one-way connection is completed, the mobile terminal 12 will be able to talk to the mobile terminal 14 and the mobile terminal 14 will be able to listen to the mobile terminal 12. However, the mobile terminal 14 will not be able to talk to the mobile terminal 12 and the mobile terminal 12 will not be able to listen to the mobile terminal 14. As, oftentimes, a one-way connection will be undesirable, the aforementioned method is repeated so that a return connection between the mobile terminal 14 and the mobile terminal 12 may be established. Accordingly, after set-up of the one-way connection between the mobile terminal 12 and the mobile terminal 14 at step 34 or after the mobile terminal 14 determines at step 30 that it is unwilling to listen to the mobile terminal 12, the method proceeds to step 36 where the connection agent B determines if it is willing to transmit to the connection agent A. If the connection agent B is willing to make such a transmission, the method proceeds to step 42 where the connection agent 20 transmits its endpoint address to the connection agent A. If, however, the connection agent B is not willing to transmit to the connection agent A, the method proceeds to step 50 where the attempt to establish a return connection between the mobile terminal 14 and the mobile terminal 12 is terminated. The method then ends at step 40.

The endpoint address issued by the connection agent B is transmitted to the connection agent A via the circuit/packet-switching module 22 of the MSC 16. Having received the endpoint address for the connection agent B, at step 44, the connection agent A determines if it is willing to listen to the connection agent B. If the connection agent A determines that it is unwilling to listen to the connection agent B, the method proceeds to step 50 where the attempt to establish a return connection between the mobile terminal 14 and the mobile terminal 12 is terminated. The method then ends at step 40.

It should be noted, however, that while the disclosed method of establishing a connection ends if the connection agent A, upon receipt of the endpoint address for the connection agent B, determines that it is unwilling to listen to the connection agent B, the connection agent A maintains the received endpoint address in memory so that it can immediately establish the connection with the connection agent B as soon as it decides to listen. For example, a held call can be immediately reconnected when it is retrieved without need for the connection agent A to query the connection agent B for its endpoint address. While the call is on hold, the connection agent B would continue to notify the connection agent A of any change to the endpoint address from which it is transmitting. The connection agent A would continue to save the most recently received endpoint address but does not listen to the address until it decides to retrieve the call.

Returning to step 44, if the connection agent A determines that it is willing to listen to the connection agent B, the method proceeds to step 46 where the connection agent A accepts the endpoint address transmitted by the connection agent B. Upon accepting the endpoint address, the method proceeds on to step 48 where the connection handler module 23, together with the connection agents 18 and 20 will attend to the set-up of a return connection from the mobile terminal 14 to the mobile terminal 12. By doing so, the mobile terminal 14 will be able to talk to the mobile terminal 12 and the mobile terminal 12 will be able to listen to the mobile terminal 14. Having established both connections between the mobile terminal 12 and the mobile terminal 14 in both directions, the method ends at step 40.

It is further contemplated that the aforementioned protocol may also be used to arrange a variety of call operations. In the foregoing description, the mobile terminal 12 instructs the connection agent A to establish a voice connection with the mobile terminal 14. Accordingly, upon executing the illustrated interworking protocol, the connection agent A transmits its endpoint address to the connection agent B. If, however, the mobile terminal 12 instructed the connection agent 18 to establish a different type of connection with the mobile terminal 14, the connection agent A could establish the requested type of connection with only minor modification to the disclosed protocol, specifically, by selecting a different type of address for transmission to the connection agent 20. For example, if the connection agent A wants to hold a call to the mobile terminal 14, the connection agent A will transmit a nil address to the connection agent 18. On the other hand, if the connection agent A wishes to establish a conference call with the mobile terminal 14, the connection agent A will transmit a conference port's address to the connection agent B.

Although illustrative embodiments of the invention have been shown and described, other modifications, changes, and substitutions are intended in the foregoing disclosure. For example, while the disclosure describes a call processing application for establishing a voice connection between first and second mobile terminals, the invention is equally suitable in other call processing applications which provide calling features such as call hold or conference calling or for establishing other types of connections such as data connection. Furthermore, while the connection protocol is disclosed in conjunction with the completion of a call in a cellular wireless network, the disclosed protocol is equally suitable for use in conjunction with other wireless networks, for example, the PCS telecommunications network, and wireline networks, for example, the PSTN telecommunications network. Accordingly, it is appropriate that the appended claims be construed broadly and in a manner consistent with the scope of the invention.

What is claimed is:

1. For a telecommunications network, a method for establishing a one-way connection between a first terminal and a second terminal, comprising:

establishing a one-way connection between said first terminal and said second terminal only when an agent of said first terminal is willing to transmit to an agent of said second terminal and said agent of said second terminal is willing to listen to said agent of first terminal, wherein the establishing comprises:

transmitting a nil address to said second terminal; and upon said agent of said second terminal accepting said nil address, said second terminal being placed on hold for said first terminal so that a one-way connection is established.

2. A switching node for a telecommunications network which includes first and second terminals, said switching node comprising:

a first connection agent for handling exchanges with the first terminal;

a second connection agent for handling exchanges with the second terminal;

a connection handler in communication with the first connection agent and in communication with the second connection agent, the connection handler containing instructions for:

determining if the first connection agent is willing to transmit to the second connection agent, if yes, then transmitting a first endpoint address to the second connection agent, determining if the second connection agent is willing to listen to the first connection agent and, if yes, then accepting the first endpoint address by the second connection agent to establish a first one-way connection between the first terminal and the second terminal in which the first terminal can talk to the second terminal and the second terminal can listen to the first terminal, determining if the second connection agent is willing to transmit to the first connection agent, and if yes, then transmitting a second endpoint address to the first connection agent, determining if the first connection agent is willing to listen to the second connection agent and, if yes, then accepting the second endpoint address to establish a second one-way connection between the first and second terminals in which the second terminal can talk to the first terminal and the first terminal can listen to the second terminal.

3. The switching node of claim 2 wherein said first terminal is a first mobile terminal, said second terminal is a second mobile terminal, said switching node is a mobile switching center and said telecommunications network is a wireless network.

4. The switching node of claim 3 wherein said connection handler module resides within a call processing application of said mobile switching center.

5. The switching node of claim 4 and further comprising a circuit/packet-switching module, coupled to said first connection agent, said second connection agent and said connection handler, said circuit/packet-switching module transferring said endpoint address for said first terminal from said first connection agent to said second connection agent and transferring said endpoint address for said second terminal from said second connection agent to said first connection agent in response to instructions issued by said connection handler.

6. A method for connecting a first mobile terminal to a second mobile terminal of a telecommunications network through an associated switching node, wherein the method occurs within the switching node, the method comprising:

determining if a first connection agent for the first mobile terminal is willing to transmit to a connection agent for the second terminal, if yes, then transmitting a first endpoint address to the second connection agent, determining if the second connection agent is willing to listen to the first connection agent and, if yes, then accepting the first endpoint address by the second connection agent to establish a first one-way connection between the first mobile terminal and the second mobile terminal in which the first mobile terminal can talk to the second mobile terminal and the second mobile terminal can listen to the first mobile terminal, determining if the second connection agent is willing to transmit to the first connection agent, and if yes, then transmitting a second endpoint address to the first connection agent, determining if the first connection agent is willing to listen to the second connection agent and, if yes, then accepting the second endpoint address to establish a second one-way connection between the first mobile terminal and the second mobile terminal in which the second mobile terminal can talk to the first mobile terminal and the first mobile terminal can listen to the second mobile terminal.

* * * * *